(12) United States Patent
Ohnishi

(10) Patent No.: US 6,765,336 B2
(45) Date of Patent: Jul. 20, 2004

(54) PRECISION POSITIONING UNIT AND LINEAR MOVEMENT CONTROL UNIT

(76) Inventor: Kazumasa Ohnishi, 121-35, Hanazonohigashi 2-chome, Nagaoka-shi, Niigata (JP), 940-0846

( * ) Notice: Subject to any disclaimer, the term of this patent is extended or adjusted under 35 U.S.C. 154(b) by 236 days.

(21) Appl. No.: 10/004,807

(22) Filed: Dec. 7, 2001

(65) Prior Publication Data

US 2002/0071755 A1 Jun. 13, 2002

(30) Foreign Application Priority Data

Dec. 7, 2000 (JP) .......................................... 2000-403907
Jul. 3, 2001 (JP) .......................................... 2001-238440

(51) Int. Cl.$^7$ ............................................. H01L 41/06
(52) U.S. Cl. .................................. 310/323.17; 310/328
(58) Field of Search ............................. 310/323.17, 328

(56) References Cited

U.S. PATENT DOCUMENTS

| | | | |
|---|---|---|---|
| 4,174,182 A | * | 11/1979 | Lendl ..................... 400/124.14 |
| 4,492,891 A | * | 1/1985 | Wieters ....................... 310/328 |
| 4,689,516 A | * | 8/1987 | Yokoyama et al. ......... 310/317 |
| 5,039,900 A | * | 8/1991 | Nashiki et al. .............. 310/328 |
| 5,079,471 A | * | 1/1992 | Nygren, Jr. .................. 310/328 |
| 5,245,243 A | * | 9/1993 | Ohnishi et al. ......... 310/323.15 |
| 5,563,465 A | * | 10/1996 | Nakahara et al. ........... 310/328 |
| 6,459,088 B1 | * | 10/2002 | Yasuda et al. ......... 250/442.11 |

* cited by examiner

Primary Examiner—Thomas M. Dougherty
(74) Attorney, Agent, or Firm—Nixon Peabody LLP; Jeffrey L. Costellia

(57) ABSTRACT

A precision positioning unit composed of a table on which an article is to be placed, a linearly movable rod which is connected with the table at one end and further connected with a rod actuating device at another end, in which the rod actuating device is capable of linearly moving the rod forward and backward, has the following characteristics:

the rod is connected with the actuating device via cushion mechanism; and by the side of the rod is placed a rod movement control device composed of an elastic member, a ultrasonic transducer, and a ultrasonic emitting surface, in which the elastic member is constituted to push the ultrasonic emitting surface to a side surface of the rod when the transducer is inactive, and the transducer functioning to draw the ultrasonic emitting surface away from the rod when it is active.

18 Claims, 6 Drawing Sheets

(PRIOR ART)

PRECISION POSITIONING UNIT AND LINEAR MOVEMENT CONTROL UNIT

FIELD OF THE INVENTION

The invention relates to a precision positioning unit and further to a linear movement control unit favorably employable for the precision positioning unit.

BACKGROUND OF THE INVENTION

The precision positioning unit is generally employed in mechanical industry and electronic industry to manipulate an article such as a workpiece in relationship to working tools A typical known positioning unit illustrated in FIG. 7 of the attached drawings.

In FIG. 7, the positioning unit is composed of a table 71 an which an article is placed, a support member 73, a screw rod 74, and a rod actuator 75 which is connected to an electric source (not shown) and causes rotation of the screw rod 74. When the screw rod 74 rotates, the support member 73 and the table 71 in combination move forward or backward. When the table 71 reaches a predetermined position, the electric connection to the rod actuator 75 is cut, accordingly the rotation of the screw rod 74 ceases to stop the linear movement of the table.

The positioning unit of FIG. 7 can not satisfactorily function for precise positioning, because a series of the necessary operations, namely, the cut of electric connection, cease of operation of the rod actuator 75, cease of rotation of the screw rod 74, and cease of the movement of the combination of the support member 73 and the table 81 by way of friction, require a considerable time. Therefore, it is not easy to position the table at the predetermined side very precisely, so long as the known positioning unit is employed. The known positioning unit also has another problem in that the screw surface of the screw rod 74 gradually wears in the course of its operation, and the worn screw surface is not appropriate for the precise positioning of the table 71.

It is an object of the invention to provide an improved precise positioning unit.

It is another object of the invention to provide a precise positioning unit whose precise positioning reliability is maintained for a long period of time, even after it is repeatedly operated.

It is a further object of the invention to provide a linear movement control unit which is employable for different uses such as control of a diaphragm valve installed in a fluid control system.

SUMMARY OF THE INVENTION

The present invention resides in a precision positioning unit comprising a table on which an article is to be placed, a linearly movable rod which is connected with the table at one end or a vicinity thereof and further connected with a rod actuating device at another end or a vicinity thereof, said rod actuating device capable of linearly moving the rod forward and backward, characterized in that:

the rod is connected with the rod actuating device via cushion mechanism; and by the side of the rod is placed a rod movement control device comprising an elastic member, a ultrasonic transducer, and a ultrasonic emitting surface, the elastic member being constituted to push the ultrasonic emitting surface to a side surface of the rod when the ultrasonic transducer is inactive, and the ultrasonic transducer functioning to draw the ultrasonic emitting surface away from the rod when it is active.

The invention also resides in a linear movement control unit comprising a linearly movable rod which is connected with a rod actuating device at one end or a vicinity thereof, said rod actuating device capable of linearly moving the rod forward and backward, characterized in that:

the rod is connected with the rod actuating device via cushion mechanism; and by the side of the rod is placed a rod movement control device comprising elastic member, a ultrasonic transducer, and a ultrasonic emitting surface, the elastic member being constituted to push the ultrasonic emitting surface to a side surface of the rod when the ultrasonic transducer is inactive, and the ultrasonic transducer functioning to draw the ultrasonic emitting surface away from the rod when it is active.

DETAILED DESCRIPTION OF THE INVENTION

The present invention is further described by referring to the figures shown in the attached drawings.

Figure 1:
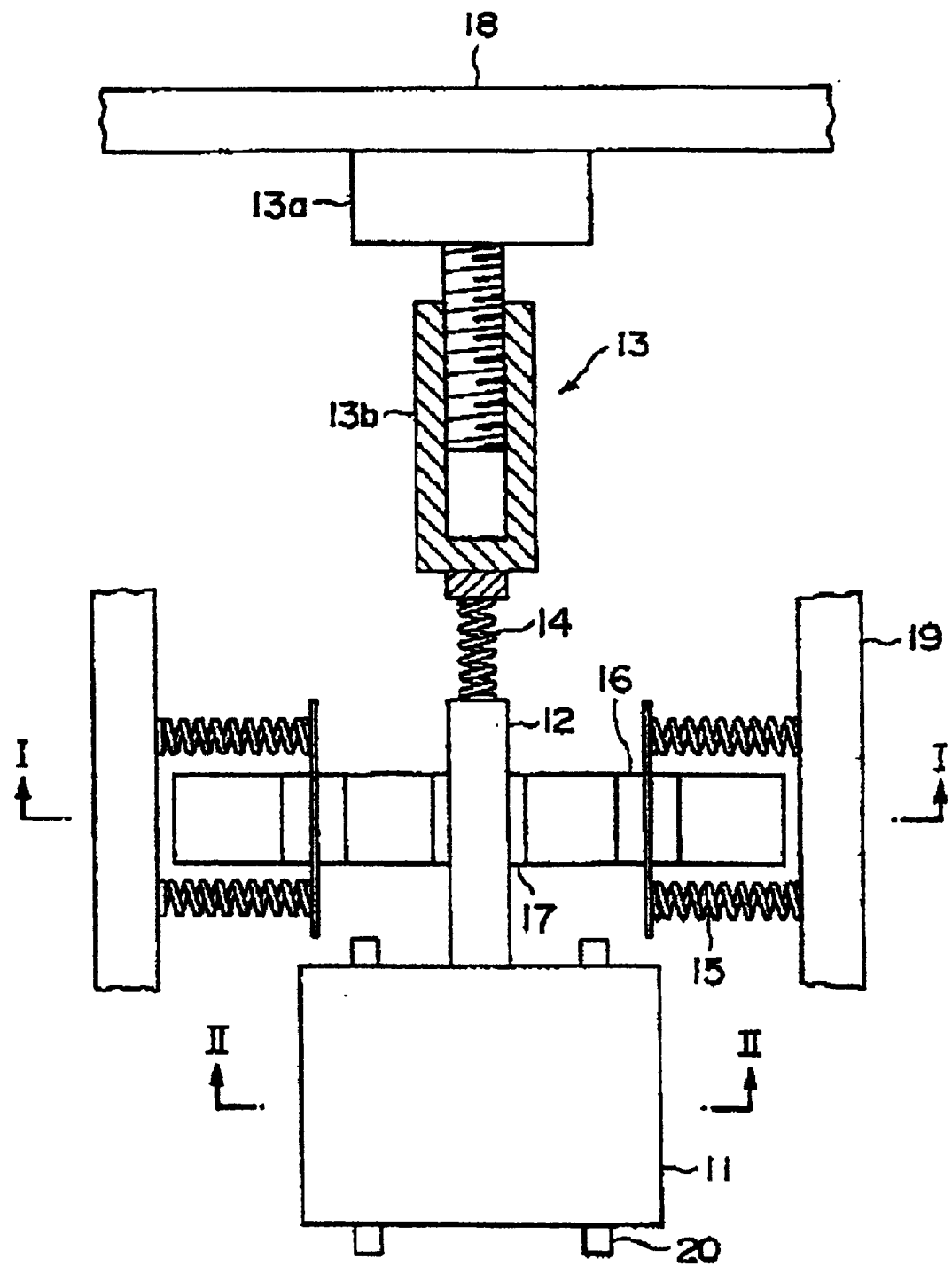
FIG. 1 is a plan view of a precision positioning unit having a linear movement control unit according to the invention.

In FIG. 1, a precision positioning unit according to the invention ha a table 11 on which an article is to be placed, a linearly movable rod 12 which is connected with the table 11 at one end or its vicinity and further connected with a rod actuating device 13 at another end or its vicinity. The rod actuating device 13 is composed of a stepping motor 13a and a ball screw 13b and is capable of linearly moving the rod 12 forward ant backward.

The rod 12 is connected with the rod actuating device 13 via cushion mechanism 14. The cushion mechanism comprises a spring as is illustrated in FIG. 1 or elastic material such as rubber.

By the side of the rod 12 is placed a rod movement control device comprising an elastic member 15, a ultrasonic transducer 16, and a ultrasonic emitting surface 17. The elastic member 15 is constituted to push the ultrasonic emitting surface 17 to a side surface of the rod 12 when the ultrasonic transducer 16 is inactive, while the ultrasonic traducer 16 functions to draw the ultrasonic emitting surface 17 away from the rod 12 when it is active.

The rod 12 can be linearly moved forward or backward by the action of the rod actuating device 12 freely with almost no friction when the ultrasonic transducer 16 is active so as to keep the ultrasonic emitting space 17 away from the rod 12 the electric energy supplied to the ultrasonic transducer 16 is cut, the emission of ultrasonic from the ultrasonic emitting surface 17 immediately steps and, by the action of the elastic member such as a pair of spring 15, the ultrasonic emitting surface 17 is brought into contact with the side surface of the rod 12, and the linear most of the rod 12 instantly stops.

The precision positioning unit further has a frame 18 for supporting the stepping motor 13a on its surface, a frame for supporting the elastic member 15, a ultrasonic transducer 16, and a ultrasonic emitting surface 17 on its surface, and a slide element 20.

Figure 2:
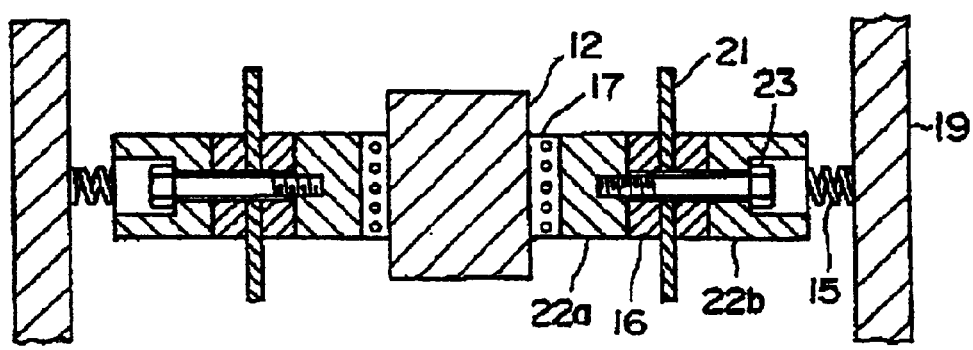
FIG. 2 is a vertical section of the linear movement control unit of the precision positioning unit of FIG. 1.

The structure of the linear movement control unit of FIG. 1 is illustrated in FIG. 2 by the vertical section. The ultrasonic transducer 16 preferably has in its center a metal plate 21 that serves for supplying electric energy to the transducer 16 from an electric source (not shown) and further as a disc support to fix the transducer 16 to the frame 19 with the elastic member 15 (such as a pair of springs). In FIG. 2, the transducer 21 is sandwitched between two solid members 22a, 22b and firmly combined to the solid members 22a, 22b by a bolt 23. This structure is generally named a bolted Langevin element. The ultrasonic emitting surface 17 is formed by a friction pad which is made of friction increasing material such as carbon fiber-reinforced plastic material. In FIG. 2, the ultrasonic transducer 16 is inactive, and therefore the ultrasonic emitting surface 17 is in contact with the rod 12. The elastic member can be of rubber or other elastic material which is placed between the frame 19 and the solid material 22b.

As shown in FIG. 2, a pair of the rod movement control device are preferably placed symmetrically around the axis of the rod 12.

Figure 3:
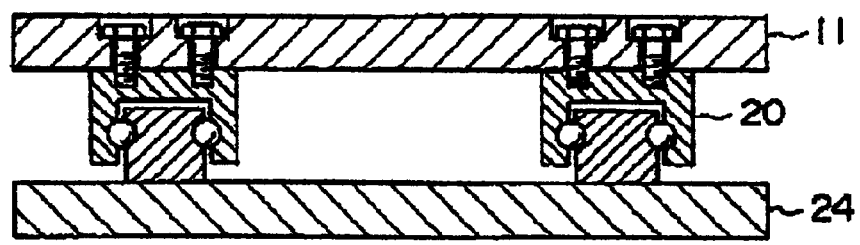
FIG. 3 is a vertical section of the table and slide unit of the precision positioning unit of FIG. 1.

In FIG. 3, the table 11 is mounted on a substrate 24 by a slide element 20 so that the table 11 can be linearly moved on the substrate 24 with almost no friction.

Figure 4:
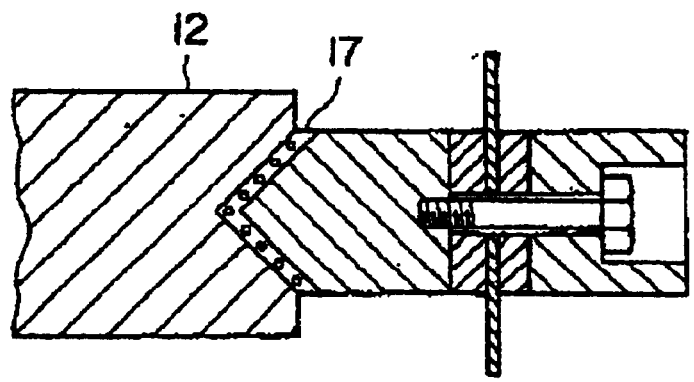
FIG. 4 shows an alternative contact mode between the rod and the ultrasonic emitting surface.
Figure 5:
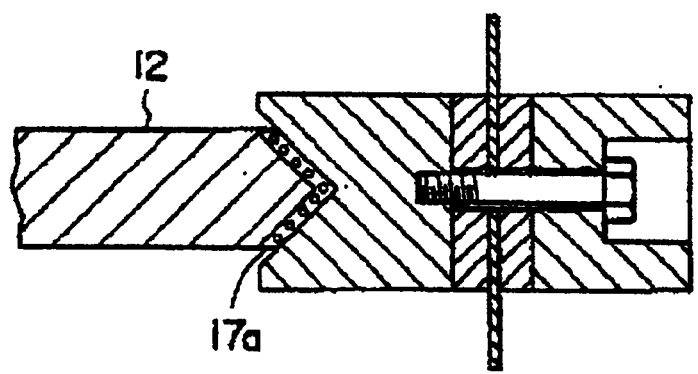
FIG. 5 shows an alternative contact mode between the rod and the ultrasonic emitting surface.

FIG. 4 and FIG. 5 show examples the mode of contact between the rod 12 and the ultrasonic emitting surface 17.

In FIG. 4, the ultrasonic emitting surface 17 shapely protrudes at its center position and the rod 12 has a groove on its side surface to receive the protruded ultrasonic emitting surface 17, so that the contact surface area can increase. In FIG. 5, the rod 12 has a friction pad 17a in the form of sharp protrusion on its surface at the center position, and the ultrasonic emitting surface has a groove to receive the protruded side surface of the rod 12, so that the contact surface area can increase.

Figure 6:
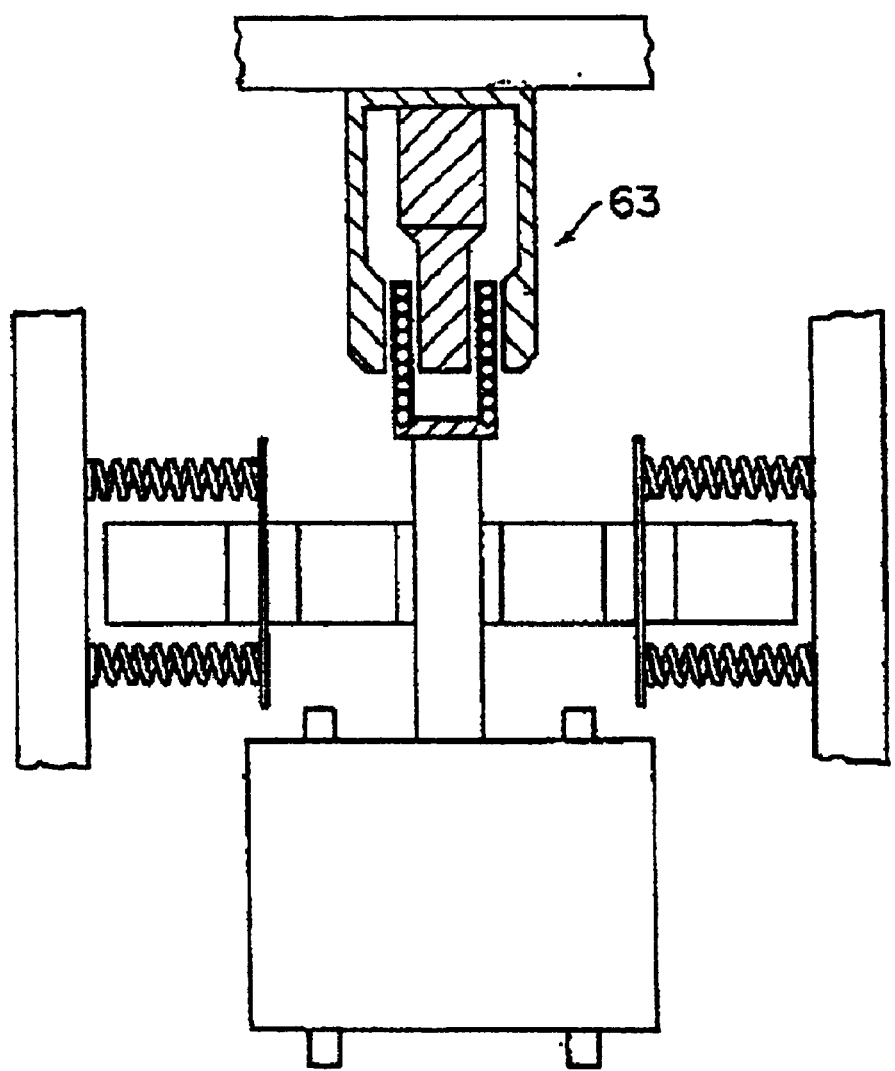
FIG. 6 is a plan view of an alternative precision positioning unit having a linear movement control unit according to the invention.
Figure 7:
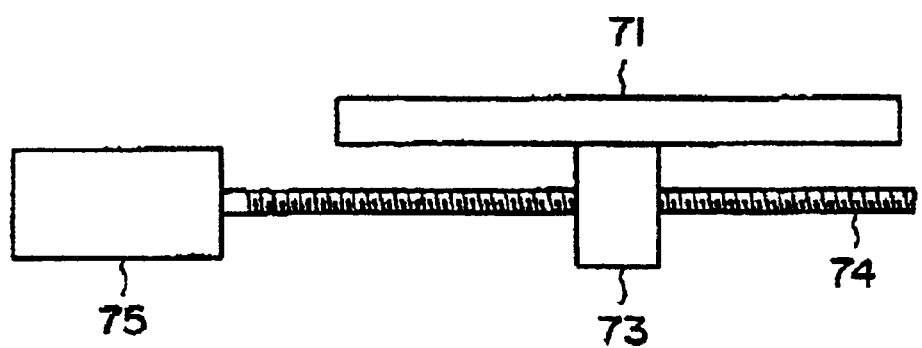
FIG. 7 is a schematic view of a typical known positioning unit.

FIG. 6 an alternative precision positioning unit according to the invention, in which the constitution differs from that of FIG. 1 only in the rod actuating device. The rod actuating device of FIG. 6 comprises a voice coil motor 63 which is connected to the rod. The voice coil motor 63 can function to actuate the linear movement of the rod with cushion mechanism.

Figure 8:
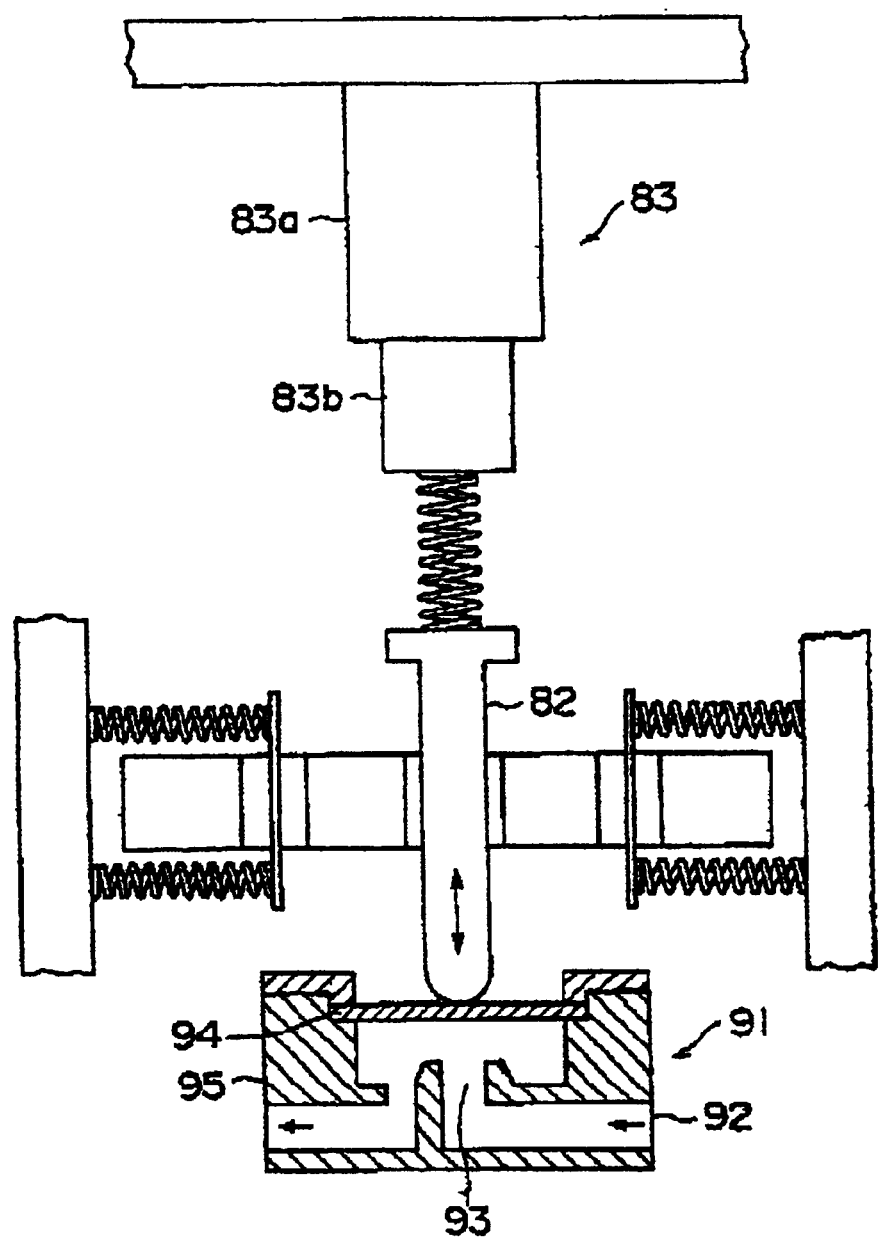
FIG. 8 is a diaphragm valve control unit equipped with a linear movement control unit of the invention.

FIG. 8 shows one of other utilization of the linear movement control unit according to the invention. In FIG. 8, the linear movement control unit is utilized to control the on-off function of a diaphragm valve 91. In more detail, a valve rod 82 is connected with a rod actuating device 83 which is composed of a linear motor 83a and a connecting rod 83b. The diaphragm valve 91 is composed of a pathway 92 for fluid, a valve unit 93, a diaphragm 94 and a seat for the diaphragm 95. The up-and-down movement of the valve rod 82 can be precisely controlled by the action of the linear movement control unit.

What is claimed is:

1. A precision positioning unit comprising a table on which an article is to be placed, a linearly movable rod which is connected with the table at one end or a vicinity thereof and further connected with a rod actuating device at another end or a vicinity thereof, said rod actuating device capable of linearly moving the rod forward and backward, comprising:

the rod is connected with the rod actuating device via cushion mechanism; and by the side of the rod is placed a rod movement control device comprising an elastic member, an ultrasonic transducer, and an ultrasonic emitting surface, the elastic member being constituted to push the ultrasonic emitting surface to a side surface of the rod when the ultrasonic transducer is inactive, and the ultrasonic transducer functioning to draw the ultrasonic emitting surface away from the rod when it is active.

2. The precision positioning unit of claim 1, wherein a pair of the rod movement control device are placed symmetrically around an axis of the rod.

3. The precision positioning unit of claim 1, wherein the ultrasonic transducer is placed and connected between two solid members using a bolt.

4. The precision positioning unit of claim 1, wherein the ultrasonic emitting surface is composed of a friction pad.

5. The precision positioning unit of claim 4, wherein the friction pad comprises carbon fiber reinforced plastic material.

6. The precision positioning unit of claim 1, wherein the ultrasonic emitting surface protrudes in a center thereof.

7. The precision positioning unit of claim 1, wherein the elastic member comprises springs.

8. The precision positioning unit of claim 1, wherein the rod actuating device comprises a stepping motor and a ball screw and the cushion mechanism comprises a spring.

9. The precision positioning unit of claim 1, wherein the rod actuating device is a voice coil motor and the cushion mechanism is included in the voice coil motor.

10. The precision positioning unit of claim 1, wherein the table is placed on a substrate in such manner that the table can slide linearly.

11. A linear movement control unit comprising a linearly movable rod which is connected with a rod actuating device at one end or a vicinity thereof, said rod actuating device capable of linearly moving the rod forward and backward, comprising:

the rod is connected with the rod actuating device via cushion mechanism; and by the side of the rod is placed a rod movement control device comprising an elastic member, an ultrasonic transducer, and an ultrasonic emitting surface, the elastic member being constituted to push the ultrasonic emitting surface to a side surface of the rod when the ultrasonic transducer is inactive, and the ultrasonic transducer being placed and connected between two solid members using a bolt and functioning to draw the ultrasonic emitting surface away from the rod when it is active.

12. The linear movement control unit of claim 11, wherein a pair of the rod movement control device are placed symmetrically around an axis of the rod.

13. The linear movement control unit of claim 11, wherein the ultrasonic emitting surface is composed of a friction pad.

14. The linear movement control unit of claim 13, wherein the friction pad comprises carbon fiber reinforced plastic material.

15. The linear movement control unit of claim 11, wherein the elastic member comprises springs.

16. The linear movement control unit of claim 11, wherein the rod actuating device comprises a stepping motor and a ball screw and the cushion mechanism comprising a spring.

17. The linear movement control unit of claim 11, wherein the rod actuating device is a voice coil motor and the cushion mechanism is included in the voice coil motor.

18. The linear movement control unit of claim 11, wherein the ultrasonic emitting surface protrudes in a center thereof.

* * * * *